G. STEVENSON.
GRAIN CLEANER.
No. 63,763.  Patented Apr. 9, 1867.
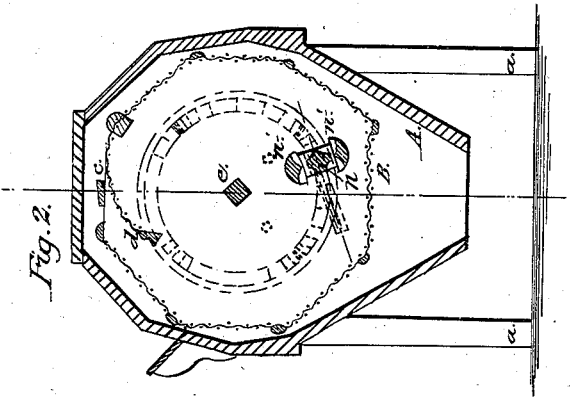
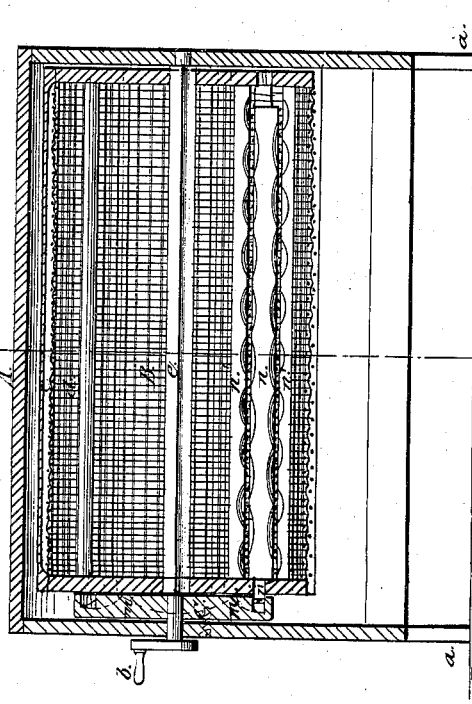
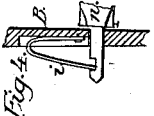
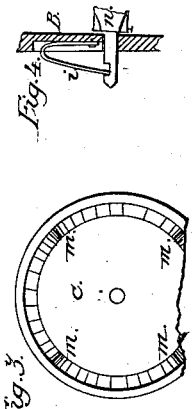

United States Patent Office.

GEORGE STEVENSON, OF ZIONSVILLE, INDIANA.

Letters Patent No. 63,763, dated April 9, 1867.

IMPROVEMENT IN GRAIN CLEANER.

*The Schedule referred to in these Letters Patent and making part of the same.*

TO ALL WHOM IT MAY CONCERN:

Be it known that I, GEORGE STEVENSON, of Zionsville, in the county of Boone, and State of Indiana, have invented a new and useful Improvement in Grain Cleaners; and I do hereby declare that the following is a full, clear, and exact description thereof, which will enable others skilled in the art to make and use the same, reference being had to the accompanying drawings, forming part of this specification, in which—

Figure 1 is a vertical longitudinal section taken in the line $x\ x$, fig. 2.

Figure 2, is a transverse section taken in the line $y\ y$, fig. 1.

Figure 3 is a detached inside view of the cam which operates the rubber.

Figure 4 is a practical section taken in the line $z\ z$, fig. 2, showing the spring on the end of the rubber for producing the reverse movement to that of the cam on the rubber.

Similar letters of reference indicate like parts.

This invention relates to an improvement in screens or cleaners of wheat and other small grain, especially designed for rubbing and scouring seed grain to free it from cockle, chess, and all other obnoxious seeds and foreign substances usually associated with and adhering to the grain, causing the farmers in the western States particularly great trouble and loss.

Patents have been granted to John J. Orider and myself for improvements in grain cleaners, dated the 22d day of March, 1864, and the 29th day of May, 1866, respectively. The general construction of the machine is the same as under those patents, but the devices previously employed for operating it, and especially for crushing and separating the bunches of cockle and other seeds which infest wheat and other small grain, have not proved so satisfactory as desired, and the present improvement is designed to remedy the defects in the operation of the grain cleaners for which patents have been granted as aforesaid. The present improvement consists in the application of a stationary cam, in combination with a spring attached to a rubbing apparatus, for effecting the necessary independent vibrating movement of the rubber bar while the screen revolves.

A represents a box frame, open at the bottom, and supported on legs $a\ a$ at the corners. B is a cylindrical screen, made of wire cloth, supported in the frame A to be rotated by the crank $b$. On one side of the screen B is a longitudinal opening, $c$, for receiving and discharging the grain. The opening $c$ is guarded on the inner side by a ring, $d$, which runs into the screen some distance like the chord of an arc of the periphery, for the purpose of allowing the screen to rotate in one direction from left to right without dropping the grain, while, when it is rotated in the other direction, from right to left, the grain after having been cleaned may be discharged through the opening $c$. At one end of the wire screen B a cam disk, C, is made fast to the frame A, through the centre of which disk the shaft $e$ of the screen passes and revolves. On the inner side of the disk C, next the head of the screen, against which it lies close without actually touching, is a series of cams, $m\ m$, cut in a circle, with recesses between them. The cams $m$ bear upon the end of a sliding bar, $n$, which runs longitudinally through the screen to act as a rubber against two bars $n'\ n'$, placed alongside of it. On the end of the sliding bar $n$ is a spring, $i$, fig. 4, which is compressed by the action of the cams $m$ in pushing the bar $n$ in one direction, and which when relieved from compression draws the bar $n$ in the opposite direction, and thus gives the required movement for rubbing and cleaning the grain while the screen revolves. The bars $n$ and $n'\ n'$ are provided with notches or serrated edges opposite each other to increase their receiving capacity, and with iron spurs or ridges on their inside faces, which lie close to each other, for the purpose of scouring the grain and breaking up the bunches of cockle and other small seeds when the screen is rotated to let them pass through it. It will be seen that by the rotation of the screen the cams $m$ on the stationary disk C will operate in the rise on the middle bar $n$ to push it inward, while the spring $i$ will operate on the fall of the cams to push it outward, and thus produce the movement required to clean the grain. About a peck of grain is put into the screen, which is turned in one direction with the crank $b$, until the grain is sufficiently cleaned, when, by a reverse movement, the clean grain is discharged through the opening $c$ into a receiver placed below. Thus a farmer may thoroughly rid his seed grain of all foreign substances and hurtful seeds.

Having thus described my invention, I claim as new, and desire to secure by Letters Patent—

The stationary cam disk C and the spring $i$, in combination with the screen B, for operating the rubber bar $n$, arranged substantially as herein described.

GEORGE STEVENSON.

Witnesses:
W. W. ATCHISON,
W. F. MORGAN.